May 14, 1963  G. J. SAMUELSON ETAL  3,089,750
RECOVERY OF VALUES FROM ORES BY USE OF ELECTRIC FIELDS
Filed Aug. 18, 1958
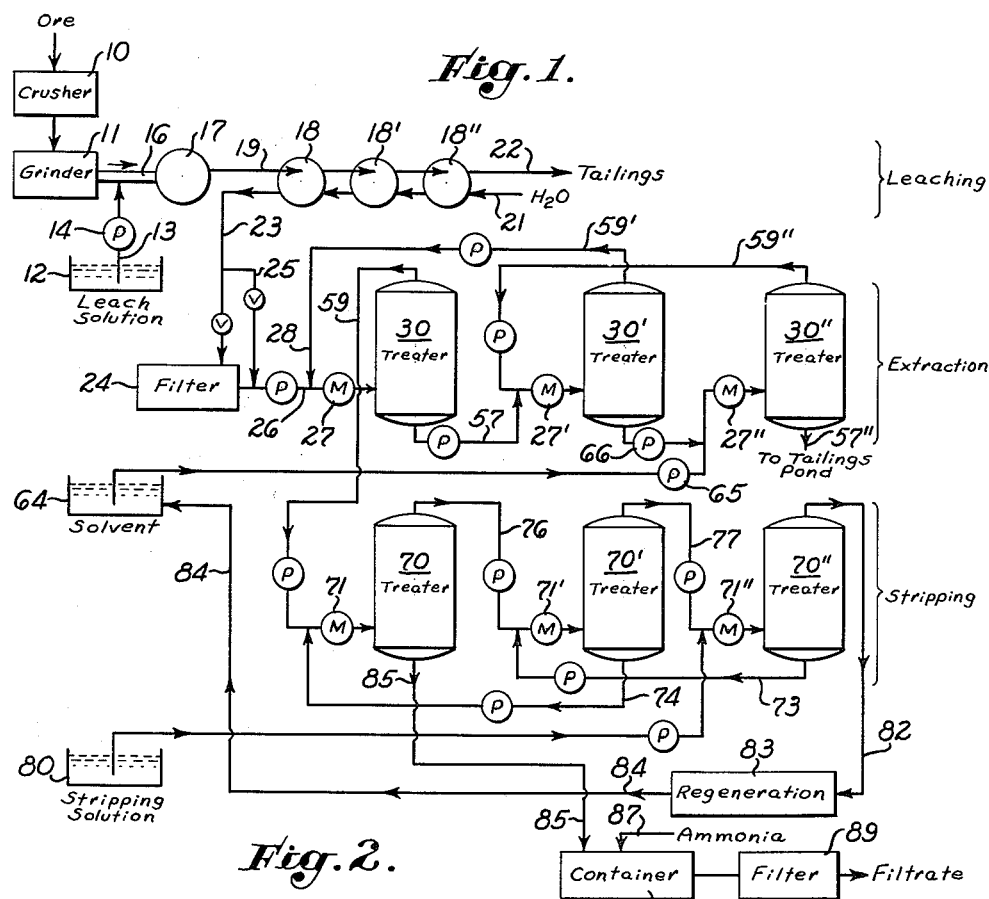
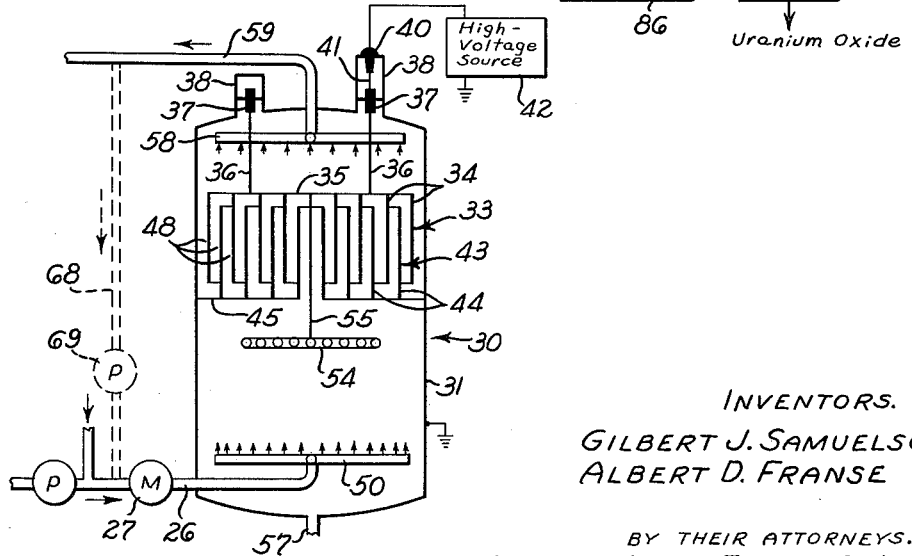
INVENTORS.
GILBERT J. SAMUELSON
ALBERT D. FRANSE
BY THEIR ATTORNEYS.
HARRIS, KIECH, FOSTER & HARRIS United States Patent Office 3,089,750
Patented May 14, 1963

3,089,750
RECOVERY OF VALUES FROM ORES BY USE OF ELECTRIC FIELDS
Gilbert J. Samuelson and Albert D. Franse, Webster Groves, Mo., assignors to Petrolite Corporation, Wilmington, Del., a corporation of Delaware
Filed Aug. 18, 1958, Ser. No. 755,469
13 Claims. (Cl. 23—14.5)

This invention relates to the purification and recovery of metals, especially from ores, and in particular relates to improvements in the application of liquid-liquid solvent extraction methods to such purification and recovery operations.

Liquid-liquid extraction procedures have become important in the processing of uranium ores, waste solutions, scrap metals and by-product solutions produced in various mineral and metallurgical processes, such as phosphate processes, for example. Uranium ores usually contain several tenths of a percent, or less, of $U_3O_8$ and are generally processed by hydrometallurgical techniques. The uranium content of the ore is solubilized by use of sulfuric acid or sodium carbonate leach liquors which also dissolve large amounts of impurities such as iron, aluminum and vanadium. It therefore becomes necessary to separate the desired uranium from the dissolved impurities. Selective adsorption of uranium on anion exchange resins or selective liquid-liquid solvent extraction methods are available for this purpose. Although there are similarities between these liquid-solid and liquid-liquid methods, the liquid-liquid solvent extraction methods possess some fundamental advantages and are growing in importance.

The selective solvent employed to extract uranium values from the aqueous leach liquors is immiscible with the liquors and consists of several percent of an extractant such as a suitable amine or alkyl phosphate dissolved in an oil or hydrocarbon solvent. Kerosene generally is used for economic reasons. Economic considerations also are important in the choice of the extractant because losses of the extractant in the discarded extracted leach liquors and by evaporation and leakage from the solvent extraction system are a major item in the cost of operating a solvent extraction plant.

In extracting the uranium values from the leach liquors the leach liquors and the selective solvent are brought into contact with each other so that the extractant of the solvent can react with the uranyl ion in the liquors to form a product which is relatively more soluble in the organic solvent phase than in the aqueous leach liquor phase. The two phases then are separated and the uranium product is separated and recovered from the organic phase by the use of a sodium carbonate or hydrochloric acid stripping operation. The organic solvent, which also is recovered in the stripping operation, is recycled to the selective solvent extraction system for repeated use.

Various methods of contacting and separating the leach liquors and the selective solvent can be employed, but a four-stage countercurrent system employing feed ratios of about 5:1 of aqueous phase to organic phase have been found to extract about 99 percent of the uranium values present in the feed liquors. Each stage of the system in practice consists of a mixing device and a settling chamber. In the mixing device the two immiscible phases are intimately contacted so that the uranium is transferred from the water phase to the organic phase. The mixture is separated to the extent possible in the settling chamber, this invariably being a slow gravity settling sometimes complicated by emulsion problems. Transfer between stages is by gravity flow.

The stripping operation is very similar to the selective solvent extraction operation described above. The principal difference resides in the fact that the uranium values are transferred from the organic selective solvent phase back to an aqueous phase; namely an aqueous stripping solution containing dissolved sodium carbonate, or hydrochloric acid, or sodium chloride and acid, etc. Again, separation is slow and sometimes troublesome.

In both the extraction and the stripping operations there is a tendency to form a more or less permanent dispersion of aqueous phase in the organic phase. In the extraction operation this tendency is disadvantageous because the organic extract phase tends to become contaminated and the aqueous phase tends to entrain valuable solvent. If the leach liquor being extracted is a slurry, the organic extract phase may be even more seriously contaminated by impurities, both in the form of solids and as dissolved impurities; also the aqueous phase tends to entrain the valuable organic phase. Similarly, in the stripping operation the organic solvent phase tends to become contaminated with droplets of stripping solution dispersed in the organic phase. This is detrimental because the organic solvent is recirculated back to the extraction system and carries with it the contaminating stripping agents such as sodium carbonate or hydrochloric acid. These agents have an effect upon the extractant and change its extractive properties. In both the extraction and stripping operations it is vitally important from a commercial standpoint that separations be complete to avoid loss of reagents. For example, commercial extraction processes commonly involve reagent losses of many hundreds of dollar a day. The importance of clean separation can be seen if it is realized that the value of some of the reagents is almost as much as that of the uranium or other values to be recovered.

It is an object of this invention to provide an efficient method for improving the sharpness of separation of the aqueous phase from the organic solvent phase in liquid-liquid solvent extraction methods applied to purification and recovery of metals from their ores.

Another object is to provide a method for more efficiently separating dispersed droplets of leach liquor from the organic solvent phase in the selective solvent extraction of metals from aqueous solutions.

A further object is to provide an efficient method for more completely separating dispersed droplets of a stripping solvent from an organic selective solvent in an operation wherein extracted metals are stripped from an organic solvent extract by an aqueous stripping solution.

We have found that the sharpness and efficiency of separation in such methods can be unexpectedly improved and carried out in smaller equipment with the aid of treatment in an electric field. Settling areas can sometimes be reduced by a factor of about 10 to 1 with the electrical process. It is an object of the invention to employ an electric field in the liquid-liquid solvent extraction and recovery of metals from their ores.

Additional objects will become apparent from the following description which is given primarily for purposes of illustration and not limitation.

A specific embodiment of the invention will be described with reference to the accompanying drawing in which:

FIG. 1 shows diagrammatically a flow sheet of an ore processing system incorporating the invention; and FIG. 2 is a vertical cross section of one type of electric treater suitable for use in the invention.

A suitable ore is fed to a crusher 10 and reduced to a particle size of a few eighths of an inch. The crushed ore is fed to a grinder 11 which further reduces the size of the ore, typically to about 20 mesh. Leach liquor from a supply vessel 12 is supplied through line 13 and pump 14 at a controlled rate and mixed with the ground ore being fed in line 16 as by a screw conveyor therein, the showing of FIG. 1 being purely diagrammatic in this respect. The resulting mixture of ground ore and leach liquor is fed to leach agitator 17. In the leach agitator 17 the pulp and liquor are retained at a desired temperature, controlled by immersion heaters, for a desired time. Additional leach liquor is added if desired to bring about a complete leaching of the ore. The preferred leach liquor is sulfuric acid, typically a 95% solution which is gradually diluted during passage through the thickeners and classifiers. Sodium carbonate solutions can also be used.

From the leach agitator 17 the resulting slurry is transferred to thickeners 18, 18' and 18'' through line 19, the thickeners operating countercurrently. Water is introduced at 21 into the end thickener 18'' from which tailings are discarded through line 22. The leach liquors are discharged from the first thickener 18 through valved line 23 to a filter 24. In passing through the filter 24, the leach liquors are clarified to produce clear, pregnant filtrate solution as feed for the solvent extraction circuit. If it is desired to extract the leach liquors directly with the organic selective solvent as the liquors are obtained from the thickener 18 in the form of slurries, the filter 24 is by-passed through a line 25 or omitted from the system and the slurries are fed to the solvent extraction circuit.

In either case the feed is supplied through a pump-equipped line 26 to a mixer 27 wherein it is mixed with an organic solvent supplied through line 28. The mixer 27 may be a mixing valve, centrifugal pump, a mixing tank of low volume provided with a paddle, or any other suitable mixer. Mixing devices other than a valve are usually desirable when processing slurries.

In accordance with the present invention the mixture is delivered to one or more electric treaters 30 for rapid resolution into a solvent or extract phase containing the metal values and an aqueous or raffinate phase substantially free of the metal values.

The electric treatment can be in one or more high-voltage electric treaters of any suitable type energized by A.C., pulsating or D.C. potentials. Therein the mixture is subjected to a high-voltage electrostatic field which rapidly coalesces the dispersed droplets or otherwise conditions the mixture for rapid separation by gravitational forces. It is often desirable preliminarily to settle the mixture or to subject it to an electric field of lower voltage gradient before it enters the ultimate high-voltage field.

A typical and particularly effective electric treater 30 giving a dual field treatment is disclosed in FIG. 2. Referring thereto, the treater includes a closed vessel 31 in which the electric treating and separating functions are performed. A first or high-voltage electrode 33 comprises cylindrical equally spaced concentric electrode members 34 depending from an open framework 35 hung from rods 36 and insulators 37, the latter being mounted in housings 38 rising from the top of the vessel 31. One housing carries a high-voltage bushing 40 traversed by a conductor 41 through which the electrode 33 is energized from a suitable high-voltage source of potential 42. A second electrode 43 comprises cylindrical electrode members 44 supported on an open framework 45 which may be supported by and electrically connected to the vessel 31. One terminal of the source 42 is electrically grounded, as is the vessel 31. The cylindrical electrode members 44 bisect the spaces between the electrode members 34 to form annular open-ended treating spaces 48 in which high-voltage electrostatic fields are established. The treating spaces are typically of a width of about 2–6", the electric fields therein being of a gradient of several thousand volts per inch. Gradients as high as 25,000 volts per inch can be used successfully in the process although somewhat lower gradients can usually be used.

The mixture to be treated, flowing through the line 26, enters a lower inlet zone of the vessel 31 and is distributed throughout a cross section thereof by a multi-arm perforated pipe distributor 50 which forms a rising liquid column in the vessel. Some of the heavier or aqueous raffinate phase will settle during this rise so that the mixture rising into the treating spaces 48 will be more concentrated in the lighter extract phase.

The electric treatment is aided to an unexpected degree if the mixture is subjected to an electric field of lower voltage gradient before it enters the treating spaces 48. This can be accomplished by using the potential of the high-voltage electrode 33 to establish a weak electric field in the rising column of the mixture in a lower treating zone below this electrode, e.g. a field between the bottom edges of the electrode members 34 and the distributor 50. A better preliminary treatment will often result by use of an auxiliary or pre-treating electrode 54 formed as a pipe grid hanging from and being electrically connected to the high-voltage electrode 33 by a hanger 55 which may form one of the electrode members 34 in the zone where it passes centrally through the innermost electrode member 44 of the other electrode.

It appears probable that the entering mixture is a double-type dispersion, some of the mixture being a dispersion of the aqueous phase in the organic phase and some being a reverse type dispersion in which the organic phase is dispersed in the aqueous phase. It is generally thought that the latter cannot be resolved by electric action for its highly conductive continuous phase of aqueous material will tend to short-circuit the electrodes 33, 43. The preliminary settling, aided if desired by the preliminary treatment in a weak electric field, which may be as low as a few hundred volts per inch and remain effective, apparently conditions the mixture for the treatment in the high-gradient electric fields in the treating spaces 48 and produces a dispersion that is predominantly organic solvent continuous with aqueous droplets dispersed therein. While passing through the main electric fields the droplets of dispersed aqueous phase in the continuous organic phase have electrostatic charges induced upon them. These induced electrostatic charges cause the droplets to attract each other and coalesce. Upon coalescing, the dispersed droplets increase in size until they become large enough to move downwardly by gravity through the organic phase.

Whatever the explanation of the treating action, the aqueous or raffinate phase is caused to settle to form a body thereof in the bottom of the vessel 31, being withdrawn therefrom through a line 57. The lighter organic or extract phase rises to form a body thereof in the top of the vessel, being withdrawn through a multi-arm perforated-pipe collector 58 and a line 59 connected thereto.

Even with a single electric treater 30 we have often been able to obtain a degree of separation in which the extract phase from the treater is bright and contains no more than a few hundredths of a percent (sometimes only a few thousandths of a percent) of residual dispersed aqueous material, the withdrawn raffinate phase being substantially free of the hydrocarbon or extract phase and of the metal values to be recovered. This is to be compared with prior mixing-settling sequences operating in large equipment wherein the extract phase is hazy and may contain from a large fraction of one percent up to several percent of residual raffinate phase, and in which the separated raffinate phase contains substantial quantities of the hydrocarbon solvent of the extract phase. Under substantially the same conditions of flow rate, size of settling zone, solvent ratio, etc., it is not uncommon to find that electric treatment will produce an effluent extract phase that is bright and contains only a few hundredths of a percent of residual aqueous material while a conventional mixing-settling operation in the same equipment but without the electric field will produce an effluent extract phase that is cloudy and that contains 15–20% residual aqueous material.

Nevertheless, operation of the electric process to give such good results is sometimes made possible and always made easier and less sensitive to solvent ratios, mixing conditions, etc. by dividing the treating action between a plurality of electric treaters connected serially, preferably in a counter-flow manner as illustrated in FIG. 1. Here treaters 30' and 30" are shown supplementing the treater 30 and of similar construction, being respectively equipped with mixers 27' and 27" corresponding to the mixer 27. With such an arrangement the fresh solvent with its extractant is withdrawn from a tank 64 and forced by a pump 65 to mingle ahead of the mixer 27" with the raffinate phase moving from treater 30' under control of a pump 66. The separated raffinate phase from the treater 30" moves through a valved line 57" to the tailings pond but the separated solvent phase is pumped back through line 59" to mingle ahead of the mixer 27' with the raffinate in line 57 from the first treater 30. The separated solvent phase from the treater 30' is likewise pumped back through the line 59' to mingle with the pumped solution in the line 26 ahead of the mixer 27 for the first treater 30. The solvent phase from the treater 30 is pumped through the line 59 to the stripping equipment to be described. In all instances the streams may be pumped directly into the mixers instead of mingling ahead thereof but it is desirable that constancy of flow and proportioning be insured by pumping the streams that are to come together.

An extraction takes place in the mixed organic and aqueous phases wherein uranium values are selectively transferred by diffusion from the pregnant leach liquors to the receptive organic extract phase, leaving impurities such as iron, aluminum, etc. in the aqueous leach liquor or raffinate phase because of the different relative solubilities of the uranium and impurities, respectively, in the two different phases.

In the recovery of uranium, the preferred solvent is an extractant dissolved in a hydrocarbon carrier. The preferred extractants are phosphate esters, such as dodecylphosphoric acid, and secondary amines, such as amine 9D–178 (Rohm & Haas) although other extractants can be employed. The preferred hydrocarbon carrier is kerosene but the invention can employ other hydrocarbons in this regard. Known solvents are employed, the invention in the extraction steps residing more in the manner in which such solvents are employed and separated than in the selection of specific or new solvents. The general reaction using phosphates can be expressed.

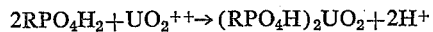

$$2RPO_4H_2 + UO_2^{++} \rightarrow (RPO_4H)_2UO_2 + 2H^+$$

The ratio of aqueous to organic materials entering the electric treater or any of them is not critical to the electrical treatment and can vary from about 2:1 to about 1:10. This is to be compared with non-electric processes where ratios may be critical where slow breaking emulsions may form. At the higher ratios mentioned above, preliminary treatment in a lower gradient field is desirable. If the over-all ratio of aqueous to organic materials used in the extraction is greater than about 2:1 it is desirable to recycle sufficient organic material from the top of any particular treater to its mixer to bring the ratio to about 2:1 or lower. FIG. 2 shows in dotted lines such a recycle line 68 and a recycle pump 69.

The one or more electric treaters can also process dilute slurries containing the leached values. Thus all or a part of the influent to the filter 24 can be by-passed through the line 25 directly to the pump feeding the line 26, the mixer 27 and the electric treater 30 which can handle slurries up to about 10% solid matter.

The organic solvent extract phase withdrawn from treater 30 through line 59, as previously described, contains substantially all of the uranium introduced into the extraction system in the leach liquors and is substantially free of impurities. The metal values therein can be recovered by conventional methods, e.g. the organic extract phase can be stripped of its uranium content by mixing with an aqueous stripping solution and then separating. During the mixing step, wherein the stripping solution is dispersed in the organic solvent phase, an extraction takes place which results in a transfer of the uranium values from the pregnant continuous organic solvent phase to the dispersed droplets of the receptive aqueous stripping solution.

Further advantages can be obtained by using one or more electric treaters in the stripping operation. The equipment for such an operation may be similar to that described with reference to the extraction system. One or more electric treaters can be used depending on local process conditions. Three electric treaters 70, 70' and 70" are shown in FIG. 1 respectively equipped with mixers 71, 71' and 71". The primary difference over the extraction system is that the heavier or aqueous effluent from the last treaters of the group is returned through lines 73 and 74 respectively to the preceding treater ahead of its mixer, the organic solvent phase progressing oppositely through the treaters in sequence. For example, the lighter effluent from the first treaters of the group is advanced to the mixer of the succeeding treater through respetcive lines 76 and 77. Metering pumps and mixer designs are employed as previously described. The fresh stripping solution is pumped from a tank 80 to the last mixer 71". The stripped organic solvent phase discharges from the last treater 70" through a line 82 to a regeneration station 83 where the concentration of the extractant is checked and readjusted, if necessary, before return through line 84 to the solvent tank 64.

The stripping solution, now containing the uranium values, is the heavier effluent from the first treater 70 and flows through a line 85 to a container 86. Conventional methods can be employed to recover the uranium from the stripping solution. For example, the acidic stripping solution may be neutralized with ammonia, supplied through a line 87, to precipitate the uranium as uranium oxide which can be separated from its mother liquor in a filter 89. The filtrate is discarded and the uranium oxide can be reduced to the free metal by known methods.

In the electrified stripping operation, conventional stripping solutions can be used. Aqueous solutions of hydrochloric acid or sodium carbonate can be used in conventional amount and concentrations. Ratios of organic solvent to aqueous stripping solution entering the electric treater or treaters can be within about the same ranges as in the extraction but ratios of about 1:1 or higher are preferred. Recycle of the separated organic phase from a treater to its mixer, as through the line 68 of FIG. 2, can be used to increase the ratio to the desired value. Separations in the stripping operation using electric treatment are excellent, the solvent being substantially completely recovered and the aqueous effluent containing no more than a few hundredths percent of residual solvent.

As an example of the effectiveness of the process, a clarified leach liquor obtained from ore containing less than .3% $U_3O_8$ was mixed with a solvent composed of kerosene containing 37 g./l. of amine 9D–178 (Rohm & Haas). The mixing was effected in a small-volume chamber under mechanical agitation. At an aqueous to organic ratio of 1:1 and a D.C. voltage gradient of 18 kv./in. the residual aqueous material in the solvent effluent was only about 0.002%, the residual solvent in the aqueous effluent being only about 120 p.p.m. This is to be compared to the not uncommon residual solvent content of 200 p.p.m. from a conventional nonelectric multistage operation, representing a loss of about one p.p.m. of uranium and valuable amines. With a ratio of 2:1 under the same conditions of electric treatment, the residual aqueous material in the solvent effluent remained about the same but the residual solvent in the aqueous phase increased to a value that would make desirable multi-treater countercurrent operation. With the ratio 2:1 and with other conditions remaining the same except that the electrodes were de-energized, the residual aqueous material in the solvent effluent increased from about 0.002% to about 10%. The above results were obtained in an electric treater in which the space between the live electrode and the distributor was very limited. By extending this space and establishing a low-voltage gradient electric field therein to the distributor even better results were obtained particularly on the mixtures of higher aqueous to organic ratio, e.g., around 2:1. The electric treater was found capable of resolving mixed type dispersions containing both oil-in-water and water-in-oil type dispersions. The preliminary field produced clear aqueous effluents substantially free of the organic material.

In general the new electric process offers substantial advantages over the conventional multi-stage mixer-settler operation. It makes possible extraction or stripping with equipment requiring less than half and often closer to one tenth the settling area per stage needed for gravity separation with comparable throughputs. Over and above this, the number of stages can be reduced and it becomes possible in some operations to use a single treater for the extraction or the stripping instead of a series of treaters connected for countercurrent operation. The process makes possible an enormous speed-up in the recovery of metals from ores by liquid-liquid extractions. This is significant as the total fluids in a typical plant may exceed 75,000 bbls./day.

Even more important, the invention avoids emulsion troubles encountered in conventional plants and at the same time produces improved products. Emulsion troubles in existing plants severely limit the speed of operation and cause shutdowns involving fantastic downtime losses, particularly in the recovery of uranium. In the electrical process some emulsification is not detrimental as the resulting systems can be resolved electrically. While intense mixing is not desirable in the electric process the degree of mixing can be more intense than with conventional operation, leading to formation of phase interfaces of greater area and thus giving more effective phase contact and better transfer of metal values from phase to phase.

Entrainment losses are greatly reduced by the invention, as previously typified. It is not uncommon to experience solvent losses in conventional processes of one half to several gallons per 1,000 gallons of aqueous liquor treated, a major portion of the loss being through entrainment with the raffinate. The losses are severe because, pound for pound, the amine for example is worth a large fraction of the worth of the uranium. The ability to produce aqueous effluents substantially free of residual solvent is thus an important advantage of the invention.

While the invention has been exemplified as employing a particular design of electric treater it is not limited thereto nor to the use of D.C. potentials for energizing the electrode system. It is possible to use A.C. or pulsating potentials with treaters like that shown in FIG. 2 or of quite different design. While best results have been obtained at quite high voltage gradients in the main fields, e.g. 10,000–25,000 volts/in., lower voltage gradients of 4,000–10,000 can be used in some instances.

It will be understood that although the invention has been described above primarily as applied to the processing of uranium ores, it is not limited to such applications. For example, it is applicable to processing of scrap metals, waste liquors, by-product streams such as those produced in phosphate processing, lignites, etc. Furthermore, the invention is not limited to the recovery of uranium but is applicable to liquid-liquid selective solvent processing of metals in general, such as thorium, molybdenum, manganese, vanadium, and, in fact, any metal. This is the case because acid, neutral and alkaline extractants have been developed so that the proper combination of extractant, solvent and solution conditions can be chosen to extract any metal from a leach liquor in preference to other metals. Rare earth metals can be separated from each other by such selective solvent liquid-liquid extraction methods. The invention described hereinabove is in general applicable in any of these cases for improving the separation of organic selective solvent phases from aqueous leach liquor phases and the separation of stripped organic selective solvent phases from aqueous stripping solution phases.

Various changes can be made without departing from the spirit of the invention as defined in the appended claims.

We claim as our invention:

1. A process for recovering metals from an aqueous solution containing such metal values and impurities, which process includes the steps of: continuously mixing with said aqueous solution an organic solvent containing an extractant acting selectively to extract said metal values; initially separating a portion of the aqueous solution from such mixture to produce an organic-solvent continuous mixture susceptible to electric resolution; further separating said organic-solvent-continuous mixture into an extract phase containing said values but no more than a few hundredths of a percent of dispersed aqueous material and a raffinate phase containing said impurities but substantially free of said metal values by subjecting said mixture in at least one electric field to electrostatic stress of the order of several thousand volts per inch followed by gravitational separation into said phases; and recycling a portion of the separated extract phase to the mixture before said initial separation thereof.

2. A process as defined in claim 1 in which the ratio of aqueous solution to organic solvent in said mixture before said initial separation ranges from about 2:1 to about 1:10.

3. A process for recovering metals from an aqueous solution containing such metal values and impurities, which process includes the steps of: continuously mixing with said aqueous solution an organic solvent containing an extractant acting selectively to extract said metal values, said mixing producing a mixture of a solvent phase containing said metal values and an aqueous phase containing said impurities; and continuously separating the resulting mixture into an extract phase containing said values but no more than a few hundredths of a percent of dispersed aqueous material and a raffinate phase containing said impurities but substantially free of said metal values by subjecting the constituents of the mixture to at least one electric treating step comprising first a subjection of such mixture to a high-voltage electrostatic field of low voltage gradient to coalesce and separate a portion of the aqueous phase therefrom to produce an organic-solvent-continuous mixture and then a subjecting of the latter mixture to an electrostatic field of equally high voltage but of a much higher voltage gradient of several thousand volts per inch followed by gravitational separation into said phases, the degree of such mixing being such that gravitational separation of said mixture in the absence of said electric fields produces an external phase containing many times the percent of residual dispersed aqueous material present in said extract phase separating following said electric treatment.

4. A process for recovering uranium from an aqueous liquor containing the uranium and other metal values, which process includes the steps of: mixing with the aqueous liquor an organic solvent dissolved in a hydrocarbon, said solvent being selected from the class consisting of alkyl phosphates and amines, the ratio of aqueous liquor to dissolved solvent being from about 2:1 to about 1:10; separating a portion of the aqueous phase of the mixture to produce a hydrocarbon-continuous mixture of reduced conductivity; and subjecting the constituents of the resulting mixture to the successive action of a high-voltage low-gradient electric field and a high-voltage high-gradient electric field and separating same into an extract phase containing said uranium values and a raffinate phase containing said other metal values, the high-voltage high-gradient electric field having a voltage gradient of about 10,000–25,000 volts per inch.

5. A process for recovering metals from aqueous solutions containing such metal values and impurities, which process includes the steps of: transferring said metal values to a solvent selective therefor and substantially immiscible in water; mixing the solvent with its metal values with an aqueous stripping solution capable of taking up the metal values; delivering a stream of the resulting mixture to the lower portion of a vessel and there separating some of the aqueous stripping solution therefrom to produce a resulting solvent-continuous mixture of reduced electric conductivity; maintaining in an upper portion of said vessel a high-voltage electrostatic electric field having a voltage gradient of at least several thousand volts per inch and advancing the resulting solvent-continuous mixture into such electrostatic electric field; and separating in said vessel the electrically treated constituents of such resulting mixture into a lighter solvent phase substantially free of said metal values and said aqueous phase and a heavier aqueous phase now containing the metal values.

6. In the liquid-liquid solvent extraction of metals from aqueous systems containing the desired metal values and impurities comprising other metal values, the steps of: selectively extracting said desired metal values from such an aqueous system into an organic phase by contacting such aqueous system with an organic solvent substantially immiscible therewith containing an extractant selective toward said desired metal values to produce a mixture of high electrical conductivity containing mixed aqueous and pregnant organic phases; conditioning said mixture to reduce its conductivity sufficiently to permit establishment of a high-voltage electric field therein by continuously delivering a stream thereof to the lower portion of a vessel and there initially separating therefrom sufficient of said aqueous phase to produce a reduced-conductivity organic-continuous mixture; passing a stream of the reduced-conductivity organic-continuous mixture between electrodes; establishing and maintaining an electric field between the electrodes of a voltage gradient of several thousand volts per inch; and separating in said vessel the electrically treated constituents of the mixture into an extract phase containing said desired metal values but no more than a few hundredths of a percent of dispersed material and a raffinate phase substantially free of such desired metal values and containing said impurities.

7. A process as defined in claim 6 in which said conditioning includes the steps of subjecting said reduced-conductivity organic-continuous mixture of aqueous and pregnant organic phases to the action of a preliminary high-voltage electric field of a much lower voltage gradient than said previously-named electric field to separate additional aqueous phase from the reduced-conductivity organic-continuous mixture.

8. A process as defined in claim 6 including the step of recycling a portion of said extract phase separating in said vessel from the top thereof to the aqueous and pregnant organic phases forming said stream of said mixture and mixing same therewith before said initial separation of aqueous phase therefrom.

9. A process as defined in claim 6 in which said aqueous system and organic solvent are mixed in a mixing zone upstream of said vessel to produce a mixture containing the aqueous phase and pregnant organic phase in a ratio between about 2:1 and about 1:10, and in which a portion of such mixture is a dispersion of the aqueous phase in the organic phase and another portion of said mixture is a reverse type dispersion of the organic phase in the aqueous phase.

10. In the liquid-liquid solvent extraction of metal values derived from ores by steps including, first, dissolving the metal values in an aqueous acid phase, second, transferring the metal values to an organic phase by contacting the acid phase with an organic solvent phase including an extractant for the metal values dissolved in a hydrocarbon carrier, third, transferring the metal values from such organic phase to another aqueous phase by contact of such organic phase with an aqueous stripping solution, to produce a pregnant aqueous stripping solution, an improved process for reducing contaminants in the pregnant aqueous stripping solution comprising: mixing such aqueous stripping solution with said organic phase containing the metal values; introducing a stream of the resulting mixture into a lower portion of a vessel and there subjecting such mixture to an initial high-voltage electrostatic field of relatively low voltage gradient to coalesce and separate some of the aqueous stripping solution and produce an organic-phase-continuous mixture of reduced electric conductivity, the voltage gradient of said initial electrostatic field being at least several hundred volts per inch; establishing and maintaining in an upper portion of said vessel a high-voltage electrostatic field having a higher voltage gradient of at least several thousand volts per inch and delivering said organic-phase-continuous mixture thereto for further coalescence and separation of aqueous stripping solution; collecting in the top of said vessel a body of the organic phase depleted in its content of metal values; collecting in the bottom of said vessel a body of the aqueous phase augmented in its content of metal values; separately withdrawing said organic and aqueous phases from said bodies; and returning a portion of said organic phase depleted in metal values from said body thereof to the aqueous stripping solution and organic phase constituents of said resulting mixture to be present therein when introduced into the lower portion of said vessel.

11. In the liquid-liquid solvent extraction of metal values derived from ores by steps including, first, dissolving the metal values in an aqueous acid phase, second, transferring the metal values to an organic phase by contacting the acid phase with an organic solvent phase including an extractant for the metal values dissolved in a hydrocarbon carrier, third, transferring the metal values from such organic phase to another aqueous phase by successively contacting such organic phase with an aqueous stripping solution in successive contact stages and, fourth, recovering the metal from the resulting pregnant aqueous stripping solution containing the metal values, an improved process for reducing contaminants in the pregnant aqueous stripping solution comprising: returning to the organic phase containing the metal values aqueous stripping solution from a succeeding contact stage and mixing same therewith; introducing a stream of the resulting mixture into the lower portion of a vessel and there separating some of the aqueous material therefrom to form an organic-continuous mixture; establishing and maintaining in an upper portion of the vessel a mixture-treating high-voltage electric field of a voltage gradient of several thousand volts per inch; subjecting the organic-continuous mixture to said electric field; separating the electrically treated constituents of the mixture in said vessel to form therein a purified organic phase and a purified aqueous phase; separately withdrawing said purified phases from said vessel; and delivering the withdrawn purified organic phase to a succeeding one of said contact stages.

12. A process as defined in claim 11 including the step of returning a portion of said withdrawn purified organic phase to the stream introduced into said vessel to be present in said resulting mixture.

13. A process for the solvent recovery of metal values present in admixture with impurities comprising other metals and solids, which process includes the steps of: dissolving said metal values and said other metallic impurities in a highly ionized aqueous solution selected from the class consisting of aqueous acid and alkaline solutions to form a pregnant aqueous solution containing said other metallic impurities and solids, said solids being present therein in amount not more than 10%; contacting said pregnant aqueous solution with an organic solvent solution comprising a hydrocarbon and an extractant selective toward said metal values to produce a mixture containing mixed aqueous and pregnant organic phases, at least some of the mixed aqueous and pregnant organic phases being present in emulsified form; delivering said mixture to the lower portion of a vessel and there introducing same at a lower level into a high-voltage unidirectional electrostatic field of relatively low voltage gradient of at least a few hundred volts per inch to coalesce some of said aqueous phase, the coalesced aqueous-phase material settling to a body of the aqueous-phase material in the bottom of said vessel containing said impurities leaving an organic-continuous mixture rising in said vessel; establishing and maintaining a more intense high-voltage unidirectional electrostatic field in an upper portion of said vessel of a voltage gradient at least several thousand volts per inch; flowing the rising organic-continuous mixture through said more intense electrostatic field and therein coalescing additional aqueous material therein, the thus coalesced material settling to said body leaving an upper extract phase containing said metal values but substantially free of aqueous material and of said impurities; continuously removing said extract phase from the top of said vessel; and removing aqueous solution containing said impurities from said body thereof.

References Cited in the file of this patent

UNITED STATES PATENTS

| | | |
|---|---|---|
| 987,117 | Cottrell | Mar. 21, 1911 |
| 2,855,356 | Stenzel | Oct. 7, 1958 |
| 2,855,357 | Stenzel | Oct. 7, 1958 |
| 2,860,031 | Grinstead | Nov. 11, 1958 |

OTHER REFERENCES

Proceedings of The International Conference on the Peaceful Uses of Atomic Energy, Aug. 8–20, 1955, vol. 8, pp. 3–12, 71–80. United Nations, New York.

Beverly et al.: WIN–72, pp. 6–16 and 23, March 29, 1957.

Chemical and Engineering News, May 21, 1956, pp. 2590 and 2592.

"Emulsion Technology," pp. 54–59, 64, 65 (1946), Chemical Publishing Co.

Becher I: "Principles of Emulsion Technology," pp. 136–142 (1955).

Becher II: "Emulsion Theory and Practice," pp. 285–298, Reinhold Publ. Co. (1957).

Nuclear Science Abstracts Vol. 10, Abstract 7568 and 8283 (1956).